United States Patent
Kaneko

(10) Patent No.: US 10,103,601 B2
(45) Date of Patent: Oct. 16, 2018

(54) TOTALLY-ENCLOSED MAIN MOTOR

(71) Applicant: MITSUBISHI ELECTRIC CORPORATION, Chiyoda-ku, Tokyo (JP)

(72) Inventor: Kenta Kaneko, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 231 days.

(21) Appl. No.: 15/125,810

(22) PCT Filed: Mar. 25, 2014

(86) PCT No.: PCT/JP2014/058313
§ 371 (c)(1),
(2) Date: Sep. 13, 2016

(87) PCT Pub. No.: WO2015/145578
PCT Pub. Date: Oct. 1, 2015

(65) Prior Publication Data
US 2017/0005545 A1    Jan. 5, 2017

(51) Int. Cl.
| | |
|---|---|
| *H02K 9/06* | (2006.01) |
| *H02K 9/10* | (2006.01) |
| *H02K 5/16* | (2006.01) |
| *H02K 5/10* | (2006.01) |

(52) U.S. Cl.
CPC ............... *H02K 9/06* (2013.01); *H02K 5/16* (2013.01); *H02K 9/10* (2013.01); *H02K 5/10* (2013.01)

(58) Field of Classification Search
CPC .............................................. H02K 9/02–9/06
See application file for complete search history.

(56) References Cited

U.S. PATENT DOCUMENTS

| | | |
|---|---|---|
| 6,774,514 B2 | 8/2004 | Matsuoka et al. |
| 8,536,744 B2 | 9/2013 | Nagayama et al. |
| 2012/0212086 A1 | 8/2012 | Nagayama et al. |

FOREIGN PATENT DOCUMENTS

| | | |
|---|---|---|
| DE | 10 2004 063 751 A1 | 7/2006 |
| JP | 5-344680 A | 12/1993 |
| JP | 6-006958 A | 1/1994 |
| JP | 11-356005 A | 12/1999 |

(Continued)

OTHER PUBLICATIONS

Extended European Search Report dated Jan. 5, 2018, issued by the European Patent Office in corresponding European Application No. 14886853.2. (8 pages).

(Continued)

*Primary Examiner* — Ramon M Barrera
(74) *Attorney, Agent, or Firm* — Buchanan Ingersoll & Rooney PC

(57) ABSTRACT

A rotor shaft is configured hollow from an end face on a counter driving side to the front of a proximal end portion of a main plate of a cooling fan. Ventilation holes communicating with a hollow section are provided on a side surface of the rotor shaft. A labyrinth is provided between an end portion on the counter driving side of the main plate and a bracket. According to rotation of the cooling fan, cooling wind enters from the end face, passes through the hollow section, and passes through a ventilation path configured by the main plate and the bearing section via the ventilation holes. The cooling wind is exhausted via an exhaust port provided in the bracket.

6 Claims, 6 Drawing Sheets

(56) References Cited

FOREIGN PATENT DOCUMENTS

| | | |
|---|---|---|
| JP | 2001-238396 A | 8/2001 |
| JP | 2004-187352 A | 7/2004 |
| JP | 2004-312875 A | 11/2004 |
| JP | 2005-333795 A | 12/2005 |
| JP | 2008-245347 A | 10/2008 |
| JP | 2010-220417 A | 9/2010 |
| JP | 2011-166908 A | 8/2011 |
| JP | 2012-050172 A | 3/2012 |
| JP | 2013-230031 A | 11/2013 |
| WO | WO 2011/004451 A1 | 1/2011 |

OTHER PUBLICATIONS

International Search Report (PCT/ISA/210) dated Jun. 3, 2014 by the Japanese Patent Office as the International Searching Authority for International Application No. PCT/JP2014/058313.

TOTALLY-ENCLOSED MAIN MOTOR

FIELD

The present invention relates to a totally-enclosed main motor.

BACKGROUND

In general, as a main motor for a railroad vehicle, a main motor of a totally enclosed type (a totally-enclosed main motor) is often adopted from the viewpoint of maintenance saving. The totally-enclosed main motor includes: a frame formed in a cylindrical shape, on the inner circumference side of which a rotor is disposed; and brackets disposed at both ends of the frame so as to oppose each other and to rotatably support a rotor shaft. A bearing is provided in the center of the brackets. A cylindrical rotor core, which houses a stator coil, is attached to an inner circumferential section of the frame. A uniform air gap is provided between the inner circumferential surface of the stator core and the outer circumferential surface of the rotor.

In the totally-enclosed main motor configured in this way, the outdoor air cannot be directly taken into the motor to cool the motor because of a structure for sealing the inside of the motor. To radiate heat in the motor to the outside, measures for, for example, increasing a heat radiation area are necessary. There is a disadvantage that an apparatus is increased in size. Therefore, to eliminate this disadvantage, there has been proposed a totally-enclosed main motor in which a cooling fan is used as a component that partitions the inside and the outside of the motor.

In the totally-enclosed main motor, the cooling fan, which partitions the inside and the outside of the motor, and a frame are in a relation of a rotating section and a fixed section. Therefore, it is necessary to provide a labyrinth between the cooling fan and the frame. Therefore, there is a problem in that dust or water slightly intrudes into the motor via the labyrinth.

To solve such a problem, in the conventional main motor described in Patent Literature 1, grease equivalent to or similar to bearing lubrication grease is applied to and filled in the labyrinth to prevent the intrusion of dust and the like.

CITATION LIST

Patent Literature

Patent Literature 1: Japanese Patent Application Laid-Open No. 2012-50172

SUMMARY

Technical Problem

However, according to the conventional technology, it is necessary to take measures to prevent the grease from being discharged during assembly work of the main motor. Further, there is a problem in that a dust-intrusion prevention effect is deteriorated because of aged deterioration of the grease.

The present invention has been devised in view of the above and it is an object of the present invention to obtain a fully-enclosed main motor capable of suppressing instruction of dust into the motor without applying grease to and filling the grease in a labyrinth.

Solution to Problem

To solve the above described problem and achieve the object, a totally-enclosed main motor according to the present invention includes: a stator; a rotor including a rotor core disposed on an inner circumferential side of the stator, a cooling fan attached to an end portion on a counter driving side of the rotor core, the cooling fan partitioning an inside and an outside of the main motor, and a rotor shaft attached to the rotor core, a hollow section being provided in the rotor shaft from an end face on the counter driving side to at least a front of an attachment place of the cooling fan in an axial direction, a ventilation hole communicating with the hollow section being provided on a side surface of the rotor; a frame enclosing the stator and the rotor; a first bracket connected to an end portion on a driving side of the frame; a second bracket connected to an end portion on the counter driving side of the frame, an exhaust port, at least a part of which is disposed further on an inner diameter side than an end portion on the counter driving side of a main plate of the cooling fan, being provided in the second bracket, the second bracket configuring a labyrinth between the second bracket and the end portion of the main plate; a first bearing section provided in the first bracket, the first bearing section supporting the rotor shaft; and a second bearing section provided in the second bracket, the second bearing section supporting the rotor shaft further on the counter driving side than the ventilation hole.

Advantageous Effects of Invention

According to the present invention, there is an effect that it is possible to suppress instruction of dust into the motor without applying grease to and filling the grease in a labyrinth.

DESCRIPTION OF EMBODIMENTS

An embodiment of a totally-enclosed main motor according to the present invention will be explained in detail below with reference to the drawings. Note that the present invention is not limited by the embodiment.

Embodiment

Figure 1:
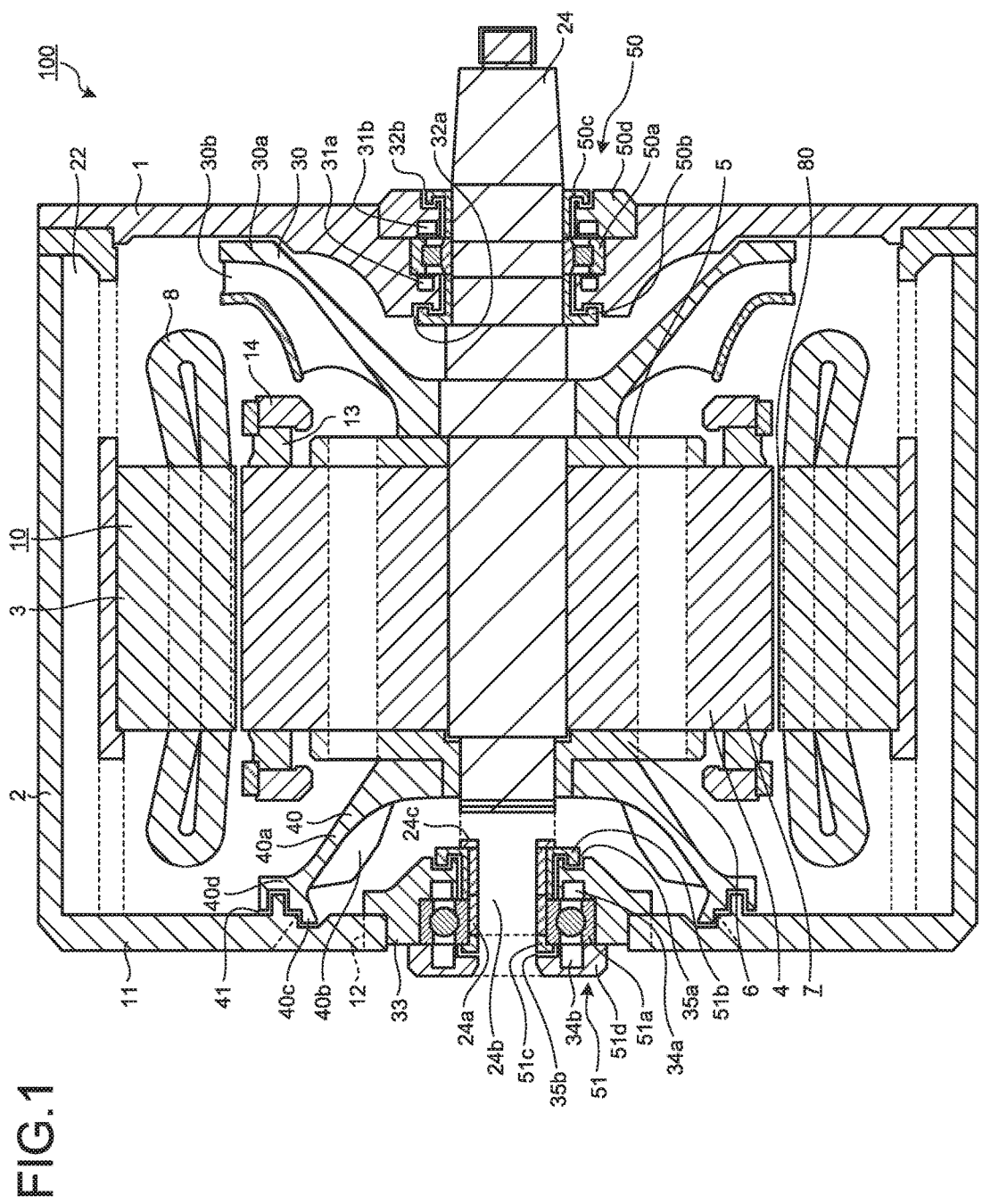
FIG. 1 is a longitudinal sectional view of a totally-enclosed main motor according to an embodiment.
Figure 2:
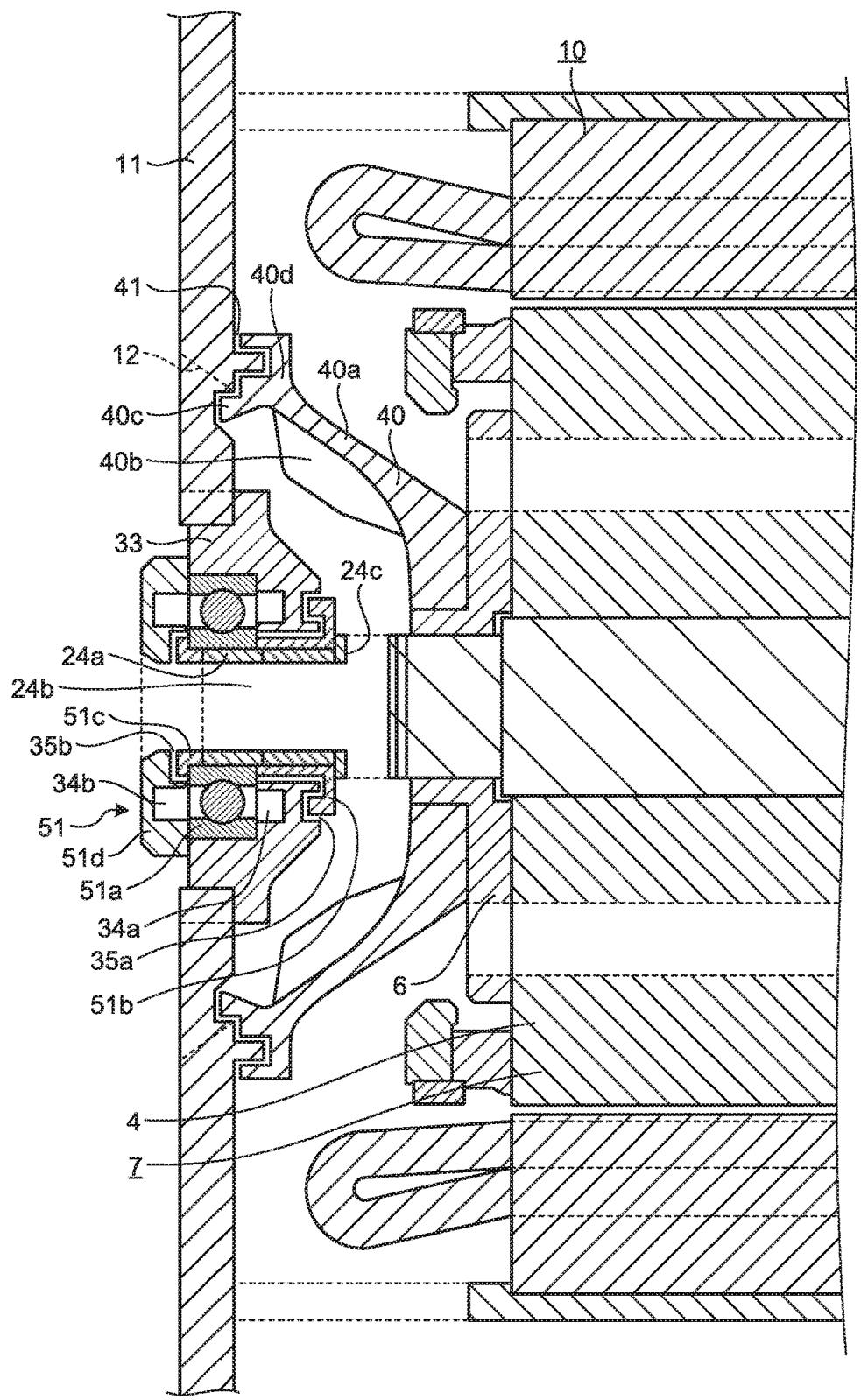
FIG. 2 is a main part enlarged view of FIG. 1.
Figure 3:
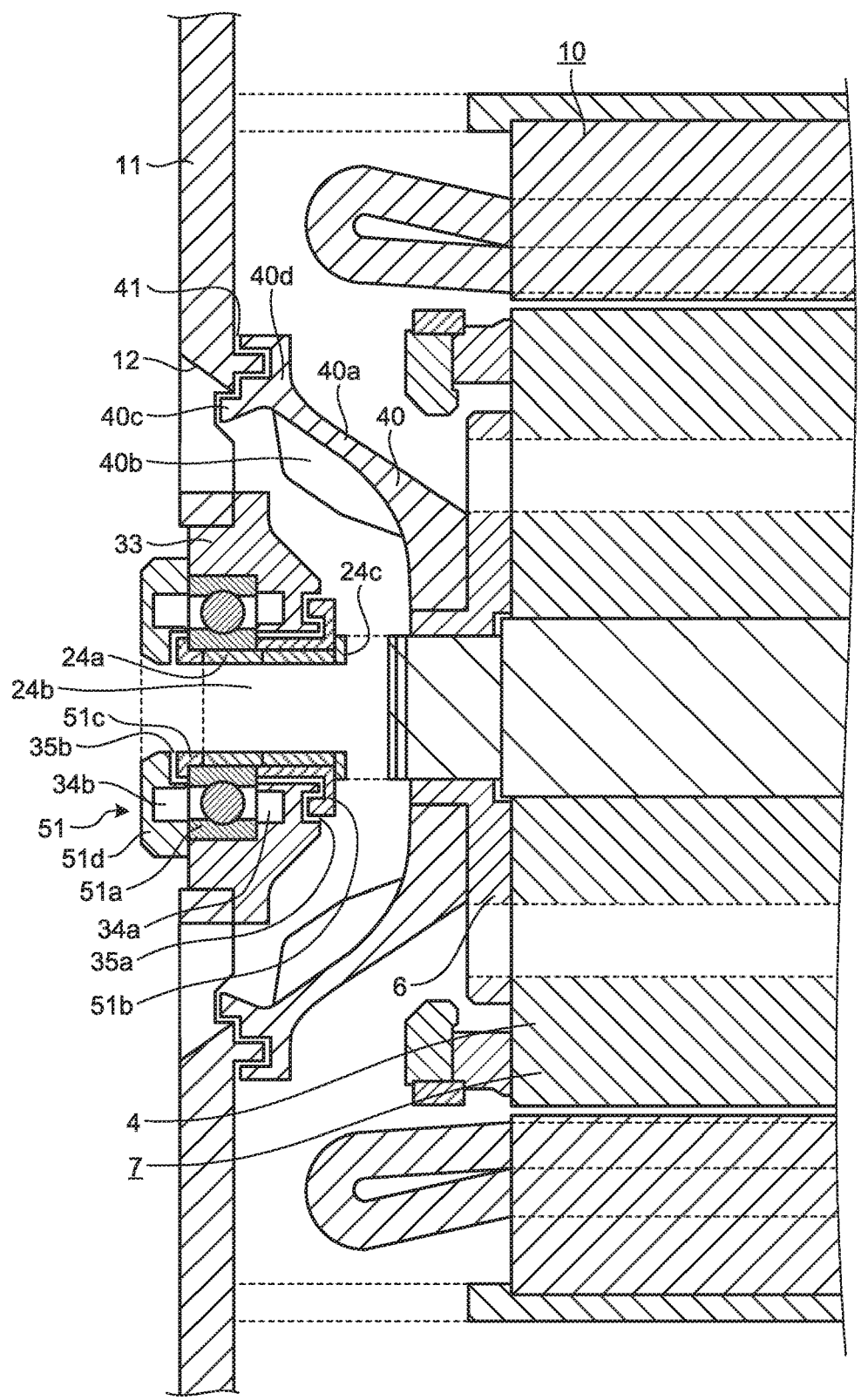
FIG. 3 is a main part enlarged view by a longitudinal section different from FIG. 1.
Figure 4:
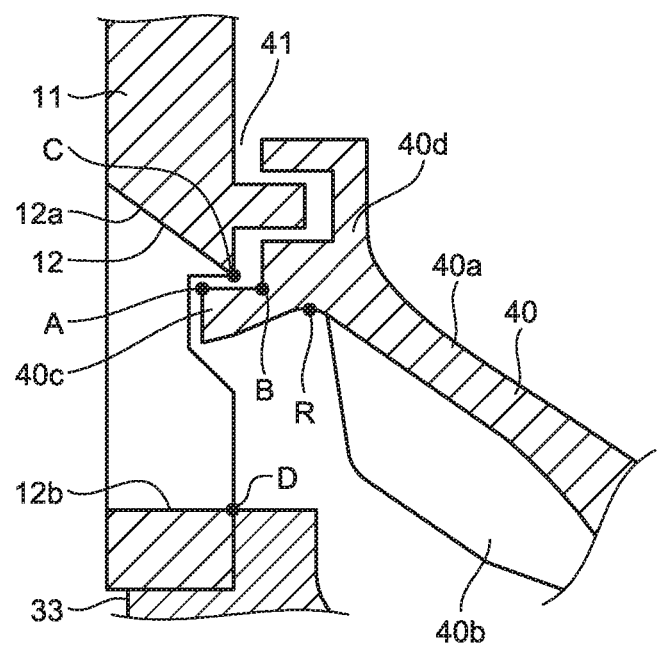
FIG. 4 is a partially enlarged view of FIG. 3.

FIG. 1 is a longitudinal sectional view of a totally-enclosed main motor according to an embodiment. FIG. 2 is a main part enlarged view of FIG. 1. FIG. 3 is a main part enlarged view by a longitudinal section different from FIG. 1. FIG. 4 is a partially enlarged view of FIG. 3. Note that FIG. 1 and FIG. 2 are longitudinal sections not including an exhaust port 12. FIG. 3 and FIG. 4 are longitudinal sections including the exhaust port 12. In FIG. 1 and FIG. 2, the position of the exhaust port 12 is indicated by a dotted line for reference. The configuration of the totally-enclosed main motor according to the present embodiment is explained with reference to FIG. 1 to FIG. 4.

A totally-enclosed main motor 100 includes: a stator 10 configured by a stator core 3 and a stator coil 8; a rotor 7 disposed on the inner circumference side of the stator 10; a cylindrical frame 2 enclosing the stator 10 and the rotor 7; a bracket 1 connected to one end portion in the axial direction of the frame 2; a bracket 11 connected to another end portion in the axial direction of the frame 2; a bearing section 50 provided in an axis center of the bracket 1; and a bearing section 51 provided in an axis center of the bracket 11. Note that, in the illustrated example, the bracket 11 is configured integrally with the frame 2. However, the bracket 11 may be separate from the frame 2.

In the frame 2, a ventilation path 22 is formed on the outer circumference side of the stator core 3. The ventilation path 22 is formed in the stator core 3 to allow a driving side (a load side) and a counter driving side (a counter load side) to communicate. For example, a plurality of ventilation paths 22 are provided in the circumferential direction of the frame 2 at an equal interval. Note that the driving side is a distal end portion side of a rotor shaft 24 connected to a not-shown load. The counter driving side refers to the opposite side of the distal end portion side. The driving side is the bracket 1 side. The counter driving side is also the bracket 11 side.

The rotor 7 includes: a rotor core 4 disposed on the inner circumference side of the stator 10 and formed by stacking electromagnetic steel plates; a core retainer 5 that covers one end side of the rotor core 4; a core retainer 6 that covers the other end side of the rotor core 4; a cooling fan 30 attached to the core retainer 5; a cooling fan 40 attached to the core retainer 6; a rotor bar 13 embedded in the rotor core 4; ring-like end rings 14 provided at both ends of the rotor bar 13; and a rotor shaft 24 fit in the rotor core 4. A uniform air gap 80 is provided between the inner circumferential surface of the stator core 3 and the outer circumferential surface of the rotor core 4. When the totally-enclosed main motor 100 is applied to a railroad vehicle, a rotating force of the rotor 7 is transmitted to wheels (not illustrated in the figure) via a joint (not illustrated in the figure) and a gear device (not illustrated in the figure) disposed on the driving side.

The bearing section 50 includes: a bearing 50a that rotatably supports the distal end portion of the rotor shaft 24; bearing stoppers 50b and 50c respectively attached to the distal end portion of the rotor shaft 24; and a bearing cap 50d attached to the bracket 1. An inner ring of the bearing 50a is sandwiched by the bearing stoppers 50b and 50c. An outer ring of the bearing 50a is sandwiched by the bracket 1 and the bearing cap 50d.

A grease pocket 31a is provided in the bracket 1. A grease pocket 31b is provided in the bearing cap 50d. The grease pocket 31a is disposed in a position opposed to one end of the bearing 50a in the axial direction. The grease pocket 31b is disposed in a position opposed to the other end of the bearing 50a in the axial direction.

A labyrinth 32a is provided between the bracket 1 and the bearing stopper 50b. A labyrinth 32b is provided between the bearing cap 50d and the bearing stopper 50c. The labyrinths 32a and 32b are maze-like very small gaps configuring a boundary between a rotating section and a fixed section. The labyrinths 32a and 32b prevent grease for lubrication from leaking to the outside of the motor and prevent intrusion of dust or water into the bearing 50a and the motor from the outside of the motor.

The bearing section 51 includes: a bearing 51a that rotatably supports a rear end portion 24a of the rotor shaft 24; bearing stoppers 51b and 51c respectively attached to the rear end portion 24a of the rotor shaft 24; a housing 33 attached to the bracket 11; and a bearing cap 51d attached to the housing 33. An inner ring of the bearing 51a is sandwiched by the bearing stoppers 51b and 51c. An outer ring of the bearing 51a is sandwiched by the housing 33 and the bearing cap 51d. Note that the rear end portion 24a is an end portion on the counter driving side of the rotor shaft 24.

A grease pocket 34a is provided in the housing 33. A grease pocket 34b is provided in the bearing cap 51d. The grease pocket 34a is disposed in a position opposed to one end of the bearing 51a in the axial direction. The grease pocket 34b is disposed in a position opposed to the other end of the bearing 51a in the axial direction.

A labyrinth 35a is provided between the housing 33 and the bearing stopper 51b. A labyrinth 35b is provided between the bearing cap 51d and the bearing stopper 51c. The labyrinths 35a and 35b are maze-like very small gaps configuring a boundary between the rotating section and the fixed section. The labyrinths 35a and 35b prevent grease for lubrication from leaking to the outside of the motor and prevent intrusion of dust or water into the bearing 51a and the motor from the outside of the motor.

A hollow section 24b is provided at the rear end portion 24a of the rotor shaft 24. In other words, the rear end portion 24a is hollow cylindrical. The hollow section 24b is provided in, for example, a cylindrical shape at fixed length in the axial direction from the rear end face of the rotor shaft 24. For example, the hollow section 24b is provided to at least the front of a proximal end portion of the cooling fan 40 (an attachment place to the rotor 7) across an attachment place of the bearing section 51 in the axial direction from the rear end face of the rotor shaft 24.

Further, for example, a plurality of ventilation holes 24c are provided in the circumferential direction on a side surface of the rear end portion 24a. Specifically, the ventilation holes 24c pierce through, in the radial direction, the side surface of the rear end portion 24a between the attachment place of the cooling fan 40 and the bearing section 51 in the axial direction and communicate with the hollow section 24b. The bearing section 51 supports the rear end portion 24a further on the counter driving side than the ventilation holes 24c. The bearing cap 51d and the bearing stopper 51c are formed in an annular shape not to close an opening of an end face of the rear end portion 24a.

The cooling fan 30 includes: for example, a basin-like main plate 30a, the inner diameter of which increases toward the driving side; and a plurality of blades 30b provided in the main plate 30a. The cooling fan 30 is attached to an end portion on the driving side of the rotor core 4 via the core retainer 5. The cooling fan 30 can agitate the air in the motor. In FIG. 1, the cooling fan 30 is provided on the driving side. However, the action and effects of this application are the same concerning a configuration not including the cooling fan 30.

The cooling fan 40 includes, for example, a basin-like main plate 40a and a plurality of blades 40b provided in the main plate 40a. The cooling fan 40 is attached to an end portion on the counter driving side of the rotor core 4 via the core retainer 6. The main plate 40a partitions the inside and the outside of the totally-enclosed main motor 100. The cooling fan 40 can agitate the air in the motor.

A labyrinth 41 is provided between the main plate 40a and the bracket 11. That is, the labyrinth 41 is provided between an end face of an end portion 40d of the main plate 40a and the inner surface of the bracket 11 opposed to the end face. The end portion 40d is an end portion on the counter driving side of the main plate 40a. The labyrinth 41 is provided at fixed length in the radial direction and provided over the circumferential direction centering on the rotor shaft 24. The labyrinth 41 extends: from an opening section on the inner diameter side to the outer diameter side; subsequently extends to the driving side in the axial direction; subsequently extends to the outer diameter side; subsequently extends to the driving side in the axial direction; subsequently extends to the outer diameter side; subsequently extends to the counter driving side in the axial direction; and further extends to the outer diameter side to be formed to an opening section on the outer diameter side. Note that a specific shape of the labyrinth 41 is not limited to the illustrated example.

For example, the inner diameter of the main plate 40a increases toward the counter driving side. Thereafter, the inner diameter turns to decrease at the end portion 40d. The inner circumferential surface of the end portion 40d is formed in a smooth recessed shape in the axial direction with respect to the rotor shaft 24.

An inner-diameter-side end portion 40c, which is a portion on the inner diameter side of the end portion 40d, projects to the counter driving side compared with, for example, the other portion of the end portion 40d. Specifically, the inner-diameter-side end portion 40c further projects to the counter driving side in the axial direction than a portion where the labyrinth 41 is not provided on the inner surface of the bracket 11 (FIG. 2).

In the bracket 11, for example, a plurality of exhaust ports 12, which pierce through the bracket 11, are provided in the circumferential direction. The exhaust port 12 is disposed such that at least a part thereof is located on the inner diameter side than the end portion 40d. In the illustrated example, the exhaust port 12 is formed in a position and a size for including the inner-diameter-side end portion 40c in an opening range in the radial direction of the exhaust port 12. A portion facing the exhaust port 12 of the inner-diameter-side end portion 40c projects into the exhaust port 12 (FIG. 3). The inner-diameter-side end portion 40c is disposed on the outer diameter side in the exhaust port 12 not to close the exhaust port 12.

In FIG. 4, details of the exhaust port 12 and the end portion 40d are illustrated. An outer-diameter-side portion of a longitudinal sectional shape of the exhaust port 12 inclines with respect to the axial direction such that the size in the radial direction of the exhaust port 12 increases toward the counter driving side. That is, an outer-diameter-side portion 12a of the surface of the bracket 11 configuring the exhaust port 12 inclines with respect to the axial direction to separate from the rotor shaft 24 toward the counter driving side. In the illustrated example, an inner-diameter-side portion of the longitudinal sectional shape of the exhaust port 12 is parallel to the axial direction. That is, an inner-diameter-side portion 12b of the surface of the bracket 11 configuring the exhaust port 12 is parallel to the axial direction. A cross sectional shape of the exhaust port 12 can be formed in, for example, a square shape. Note that the cross sectional shape of the exhaust port 12 can also be a shape other than the square shape. The inner-diameter-side portion 12b can also be inclined with respect to the axial direction to the opposite side of the outer-diameter-side portion 12a. In this case, the cross sectional shape of the exhaust port 12 can be formed in, for example, a circular shape.

In FIG. 4, the length of the inner-diameter-side end portion 40c is indicated by a line between A and B. An axial direction position on the inner side of the exhaust port 12 is indicated by a straight line connecting C and D. A part in the axial direction of the inner-diameter-side end portion 40c projects into the exhaust port 12. Therefore, the line AB and the line CD cross.

As illustrated in FIG. 4, a straight line formed by extending the outer-diameter-side portion of the longitudinal sectional shape of the exhaust port 12 to the driving side crosses the line AB. An intersection of the lines is located between A and B. Consequently, an entrance of the labyrinth 41 can be narrowed in the exhaust port 12. Therefore, it is possible to suppress intrusion of water.

As explained above, the inner circumferential surface of the end portion 40d is formed in a smooth recessed shape in the axial direction with respect to the rotor shaft 24 (see the vicinity of R).

Figure 5:
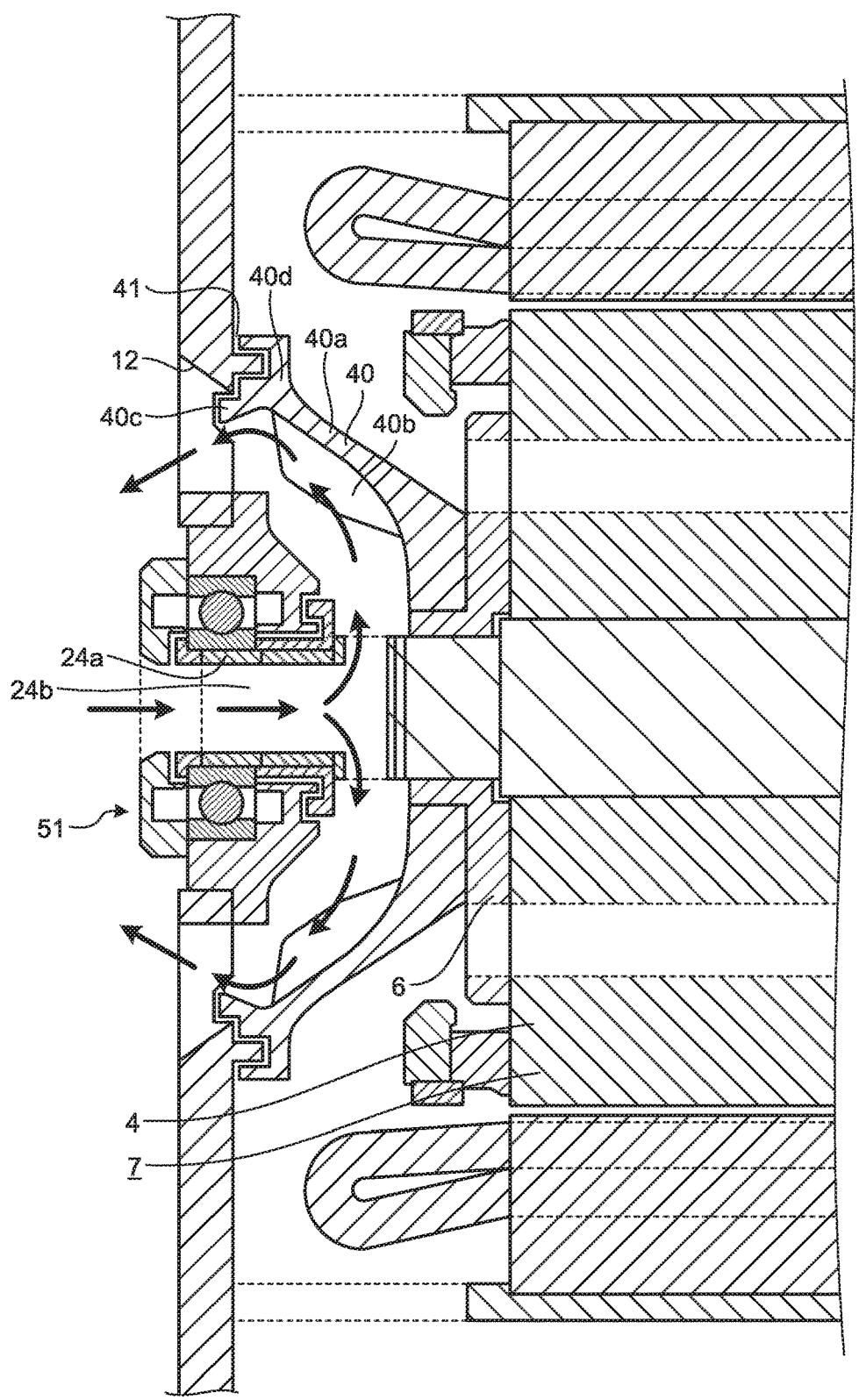
FIG. 5 is a diagram for explaining an operation and an effect of the embodiment.
Figure 6:
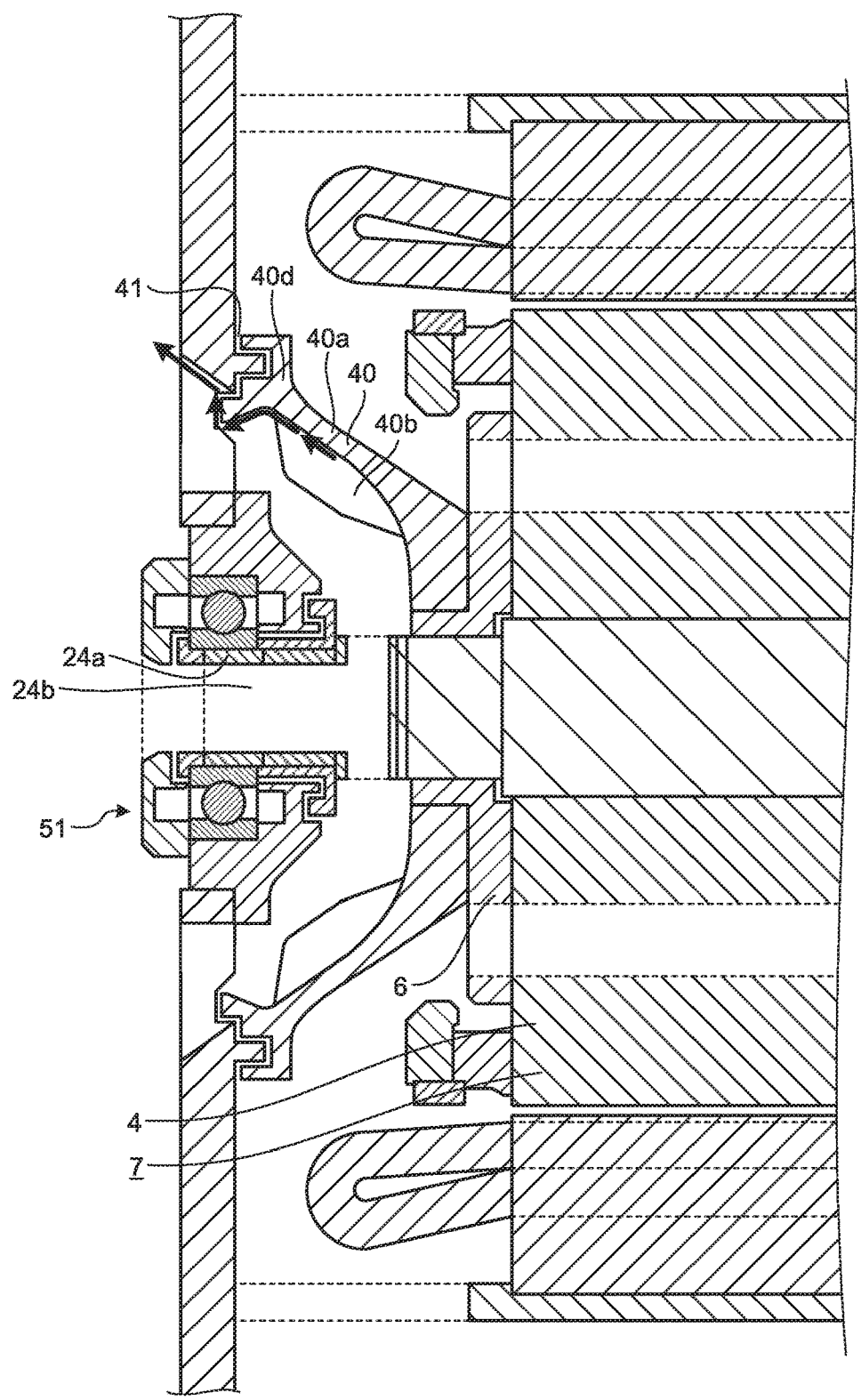
FIG. 6 is another diagram for explaining the operation and the effect of the embodiment.

An operation and an effect of the present embodiment will be explained with reference to FIG. 5 and FIG. 6. FIG. 5 is a diagram for explaining the operation and the effect of the present embodiment. Arrows indicate a wind flow. FIG. 6 is another diagram for explaining the operation and the effect of the present embodiment. Arrows indicate a moving direction of water.

As illustrated in FIG. 5, the cooling fan 40 rotates according to the rotation of the rotor 7. When the cooling fan 40 rotates, cooling wind enters from the end face of the rear end portion 24a of the rotor shaft 24, passes through the hollow section 24b, flows out in the outer diameter direction from the ventilation holes 24c, and further flows through a wind path formed between the main plate 40a and the bearing section 51. The direction of the cooling wind is changed to the inner diameter side on the inner circumferential surface of the end portion 40d. The cooling wind is exhausted from the exhaust port 12.

In this way, in the present embodiment, after flowing in the hollow section 24b of the rotor shaft 24, the cooling wind flows through the wind path formed between the main plate 40a and the bearing section 51. Therefore, the cooling wind flows from the center side to the outer circumference side of the bearing section 51. Unlike the structure in which only the outer circumference side of the bearing 51a is cooled as in the past, the center side of the bearing section 51 can also be cooled. Further, by providing the hollow section 24b, heat from the rotor core 4 side is also blocked. Therefore, in the present embodiment, a temperature rise of the bearing section 51 is suppressed even if an air quantity by the cooling fan 40 is reduced. Therefore, it is possible to reduce the ability of the cooling fan 40 and reduce the air quantity. Consequently, wind pressure decreases, dust led to the labyrinth 41 is suppressed. It is possible to suppress intrusion of the dust into the inside of the totally-enclosed main motor 100.

Therefore, according to the present embodiment, it is possible to suppress intrusion of the dust into the labyrinth 41 and prevent intrusion of the dust into the motor without applying grease to and filling the grease in the labyrinth 41 unlike Patent Literature 1.

In the present embodiment, the cooling wind mixed with the dust is directed to the rotor shaft 24 side at the end portion 40d. Therefore, the dust less easily intrudes into the labyrinth 41. Intrusion of the dust into the labyrinth 41 is further prevented. That is, the dust is exhausted from the exhaust port 12 together with the cooling wind before reaching the entrance of the labyrinth 41. Note that the inner circumferential surface of the end portion 40d is desirably formed in a recessed shape and smoothly in the axial direction. However, shapes other than this shape are also possible as long as the cooling wind is directed to the rotor shaft 24 side.

As illustrated in FIG. 6, water moves as indicated by the arrows in the figure. That is, water adhering to the inner circumferential surface of the main plate 40a moves to the counter driving side in the axial direction along the inner circumferential surface of the main plate 40a with a centrifugal force and a wind flow caused by the rotation of the cooling fan 40 and reaches the distal end of the inner-diameter-side end portion 40c. Further, the water moves along the end face of the inner-diameter-side end portion 40c and the surface configuring the exhaust port 12 (the outer-diameter-side portion 12a in FIG. 4) to be discharged from the exhaust port 12. That is, because the inner-diameter-side end portion 40c is projected into the exhaust port 12, the water flowed along the main plate 40a does not intrude into the labyrinth 41 beyond a first radial direction portion of the labyrinth 41.

As explained above, when the outer-diameter-side portion 12a on the surface of the bracket 11 configuring the exhaust port 12 or the longitudinal sectional shape on the outer diameter side of the exhaust port 12 is extended to the driving side, the outer-diameter-side portion 12a or the longitudinal sectional shape crosses the outer-diameter-side side surface of the inner-diameter-side end portion 40c (FIG. 4). Consequently, the entrance of the labyrinth 41 can be narrowed in the exhaust port 12. The intrusion of the water is further suppressed.

Note that, in FIG. 4 of Patent Literature 1, the labyrinth is provided between the ventilation fan (415) and the bracket (204). However, in the configuration illustrated in FIG. 4 of Patent Literature 1, the labyrinth is present further on the inner side than the exhaust port. A part of the cooling wind flowed out from the inside is bounced back by the wall surface of the bracket (204). In this case, in the configuration illustrated in the figure, because the opening section of the labyrinth is opened on the opposite side of the wall surface of the bracket (204), the dust included in the cooling wind intrudes into the labyrinth. The portion of the bracket (204) projecting toward the ventilation fan (415) is formed in the recessed shape near the opening section of the labyrinth. Therefore, in this shape, water easily accumulates near the opening of the labyrinth. When the water accumulates in this place, the water is pushed into the labyrinth.

On the other hand, in the present embodiment, the opening section on the inner diameter side of the labyrinth 41 is opened in the radial direction. Therefore, even if the cooling wind is bounced back by the wall surface of the bracket 11, the cooling wind including the dust is suppressed from entering the labyrinth from the opening section. By projecting the inner-diameter-side end portion 40c into the exhaust port 12, the water flowed along the main plate 40a is suppressed from intruding into the labyrinth 41 beyond the first radial direction portion of the labyrinth 41.

Note that the totally-enclosed main motor 100 according to the present embodiment indicates an example of the contents of the present invention. Naturally, the totally-enclosed main motor 100 can be combined with still other publicly-known technologies and can be changed to, for example, omit a part of the totally-enclosed main motor 100 without departing from the spirit of the present invention.

INDUSTRIAL APPLICABILITY

As explained above, the present invention is useful as, for example, a totally-enclosed main motor for a railroad vehicle.

REFERENCE SIGNS LIST 1, 11 bracket
2 frame
3 stator core
4 rotor core
5, 6 core retainer
7 rotor
8 stator coil
10 stator
12 exhaust port
12a outer-diameter-side portion
12b internal-diameter-side portion
13 rotor bar
14 end ring
22 ventilation path
24 rotor shaft
24a rear end portion
24b hollow section
24c ventilation hole
30 cooling fan
30a main plate
30b blade
31a, 31b, 34a, 34b grease pocket
32a, 32b, 35a, 35b labyrinth
33 housing
40 cooling fan
40a main plate
40b blade
40c inner-diameter-side end portion
40d end portion
41 labyrinth
50, 51 bearing section
50a, 51a bearing
50b, 50c, 51b, 51c bearing stopper
50d, 51d bearing cap
80 air gap
100 totally-enclosed main motor

The invention claimed is:
1. A totally-enclosed main motor comprising:
a stator;
a rotor including a rotor core disposed on an inner circumferential side of the stator, a cooling fan attached to an end portion on a counter driving side of the rotor core, the cooling fan partitioning an inside and an outside of the main motor, and a rotor shaft attached to the rotor core, a hollow section being provided in the rotor shaft from an end face on the counter driving side to at least a front of an attachment place of the cooling fan in an axial direction, a ventilation hole communicating with the hollow section being provided on a side surface of the rotor;
a frame enclosing the stator and the rotor;
a first bracket connected to an end portion on a driving side of the frame;
a second bracket connected to an end portion on the counter driving side of the frame, an exhaust port, at least a part of which is disposed further on an inner diameter side than an end portion on the counter driving side of a main plate of the cooling fan, being provided in the second bracket, the second bracket configuring a labyrinth between the second bracket and the end portion of the main plate;
a first bearing section provided in the first bracket, the first bearing section supporting the rotor shaft; and
a second bearing section provided in the second bracket, the second bearing section supporting the rotor shaft further on the counter driving side than the ventilation hole.

2. The totally-enclosed main motor according to claim 1, wherein an inner circumferential surface of the end portion of the main plate is formed smoothly and in a recessed shape in the axial direction.

3. The totally-enclosed main motor according to claim 1, wherein
- an inner-diameter-side end portion, which is a portion of the end portion of the main plate further projects to the counter driving side than the other portion of the end portion,
- the exhaust port is formed in a position and a size for including the inner-diameter-side end portion in an opening range in a radial direction of the exhaust port, and
- a portion facing the exhaust port of the inner-diameter-side end portion projects into the exhaust port.

4. The totally-enclosed main motor according to claim 3, wherein the inner-diameter-side end portion is disposed on an outer diameter side in the exhaust port.

5. The totally-enclosed main motor according to claim 4, wherein a longitudinal sectional shape on the outer diameter side of the exhaust port inclines with respect to the axial direction such that a size in the radial direction of the exhaust port increases toward the counter driving side.

6. The totally-enclosed main motor according to claim 5, wherein, when the longitudinal sectional shape on the outer diameter side of the exhaust port is extended to the driving side, the longitudinal sectional shape crosses an outer-diameter-side side surface of the inner-diameter-side end portion.

* * * * *